US010860352B2

(12) United States Patent
Phelan et al.

(10) Patent No.: US 10,860,352 B2
(45) Date of Patent: Dec. 8, 2020

(54) HOST SYSTEM AND METHOD FOR MANAGING DATA CONSUMPTION RATE IN A VIRTUAL DATA PROCESSING ENVIRONMENT

(71) Applicant: HEWLETT PACKARD ENTERPRISE DEVELOPMENT LP, Houston, TX (US)

(72) Inventors: Thomas A. Phelan, San Francisco, CA (US); Joel Baxter, San Carlos, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 95 days.

(21) Appl. No.: 14/341,596

(22) Filed: Jul. 25, 2014

(65) Prior Publication Data

US 2015/0033226 A1 Jan. 29, 2015

Related U.S. Application Data

(60) Provisional application No. 61/858,463, filed on Jul. 25, 2013.

(51) Int. Cl.
*G06F 9/455* (2018.01)
*G06F 9/50* (2006.01)

(52) U.S. Cl.
CPC ...... *G06F 9/45545* (2013.01); *G06F 9/45558* (2013.01); *G06F 9/5016* (2013.01)

(58) Field of Classification Search
CPC . G06F 9/45545; G06F 9/45558; G06F 9/5016
See application file for complete search history.

(56) References Cited

U.S. PATENT DOCUMENTS

| 8,762,993 B2* | 6/2014 | Bulson | G06F 9/5044 718/1 |
| 8,966,495 B2* | 2/2015 | Kulkarni | G06F 9/45558 709/223 |
| 2008/0071939 A1* | 3/2008 | Tanaka | G06F 11/3419 710/18 |

(Continued)

OTHER PUBLICATIONS

Rettus, Accounting control of data processing, IEEE, 2010 reprint of IBM Systems Journal ( vol. 11, Issue: 1, 1972) pp. 74-92.*

*Primary Examiner* — Jung W Kim
*Assistant Examiner* — Bruce S Ashley
(74) *Attorney, Agent, or Firm* — Jaffery Watson Mendonsa & Hamilton

(57) ABSTRACT

Embodiments disclosed herein provide systems, methods, and computer readable media for managing data consumption rate in a virtual data processing environment. In a particular embodiment, a method provides, in a cache node of a host system, identifying read completions for one or more virtual machines instantiated in the host system, with the one or more virtual machines processing one or more processing jobs. The method further provides allocating the read completions to individual processing jobs of the one or more processing jobs and accumulating the read completions on a per-job basis, with the cache node determining a data consumption rate for each processing job of the one or more processing jobs.

20 Claims, 6 Drawing Sheets

(56) References Cited

U.S. PATENT DOCUMENTS

| | | | | |
|---|---|---|---|---|
| 2009/0043723 | A1* | 2/2009 | Hino | G06F 17/3089 |
| | | | | 706/46 |
| 2010/0082319 | A1* | 4/2010 | Cherkasova | G06F 9/5083 |
| | | | | 703/22 |
| 2012/0260248 | A1* | 10/2012 | Katiyar | G06F 9/45533 |
| | | | | 718/1 |
| 2012/0278578 | A1* | 11/2012 | Castillo | G06F 12/02 |
| | | | | 711/165 |
| 2013/0122854 | A1* | 5/2013 | Agarwal | H04L 12/141 |
| | | | | 455/405 |
| 2013/0290957 | A1* | 10/2013 | Li | G06F 9/5066 |
| | | | | 718/1 |
| 2013/0346966 | A1* | 12/2013 | Natu | G06F 11/3409 |
| | | | | 718/1 |
| 2014/0317284 | A1* | 10/2014 | Navarette | H04L 43/0876 |
| | | | | 709/224 |
| 2014/0359624 | A1* | 12/2014 | Cherkasova | G06F 11/3404 |
| | | | | 718/100 |

* cited by examiner

HOST SYSTEM AND METHOD FOR MANAGING DATA CONSUMPTION RATE IN A VIRTUAL DATA PROCESSING ENVIRONMENT

CROSS-REFERENCE TO RELATED APPLICATION

This patent application refers to, and claims priority to, U.S. provisional patent application No. 61/858,463, entitled "Job manager and method for managing processing jobs in processing environments" and filed on Jul. 25, 2013, wherein the prior application is herein incorporated by reference in entirety.

TECHNICAL FIELD

Aspects of the disclosure are related to computing hardware and software technology, and in particular to managing data consumption rate in a virtual data processing environment.

TECHNICAL BACKGROUND

An increasing number of data-intensive distributed applications are being developed to serve various needs, such as for processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop™, Amazon S3, and CloudStore™, among others.

At the same time, virtualization techniques have gained popularity and are now commonplace in data centers and other environments, increasing the efficiency with which computing resources are used. In a virtualized environment, one or more virtual machines are instantiated on an underlying computer (or another virtual machine) and share the resources of the underlying computer. However, monitoring and controlling processing operations in virtualized machines or processes has been problematic. One problem is the latency involved in reading and writing data in virtual machines. Latency can be a significant difficulty, especially where massive amounts of data are being processed. Latency can be aggravated by competition for data access, high traffic levels, and physical distance, for example.

Overview

Embodiments disclosed herein provide systems, methods, and computer readable media for managing data consumption rate in a virtual data processing environment. In a particular embodiment, a method provides, in a cache node of a host system, identifying read completions for one or more virtual machines instantiated in the host system, with the one or more virtual machines processing one or more processing jobs. The method further provides allocating the read completions to individual processing jobs of the one or more processing jobs and accumulating the read completions on a per-job basis, with the cache node determining a data consumption rate for each processing job of the one or more processing jobs.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
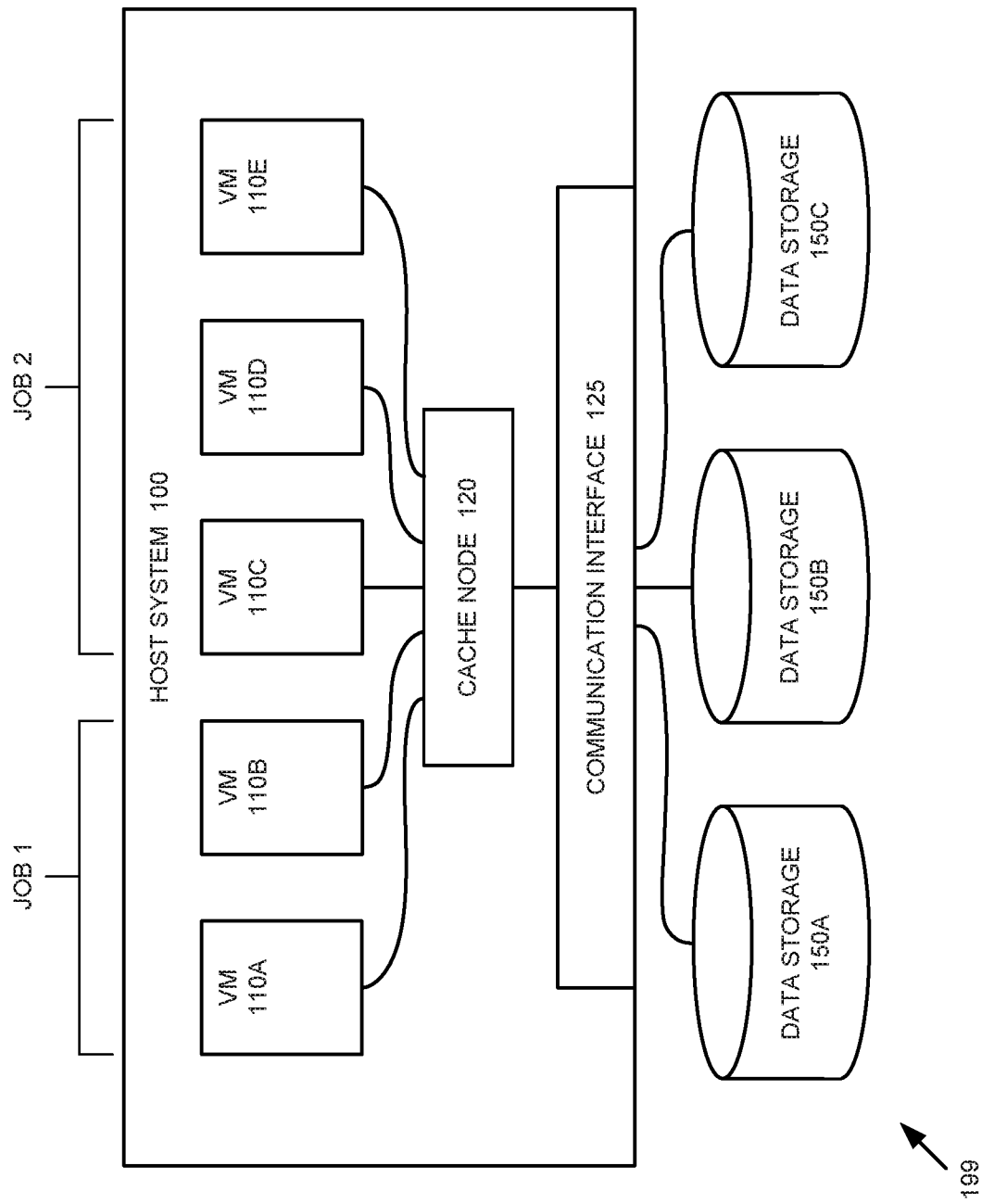
FIG. 1 shows an exemplary virtual data processing environment comprising a host system in communication with a plurality of data storage systems.

FIG. 1 shows an exemplary virtual data processing environment 199 comprising a host system 100 in communication with a plurality of data storage systems 150A-150C (hereinafter referred to together as data storage systems 150). The host system 100 includes a plurality of instantiated virtual machines 110A-110E (hereinafter referred to together as virtual machines 110), a cache node 120 in communication with the plurality of instantiated virtual machines 110, and a communication interface 125 coupled to the cache node 120, see FIGS. 1-2. The host system 100 further includes a host processing system 101 and a host system memory 102, wherein the plurality of virtual machines 110 comprise software instances stored in the host system memory 102 and executed by the host processing system 101 (see FIG. 2). It should be understood that other logical components or sub-units may be included in the host system 100 but are not shown for clarity.

It should be understood that the host system 100 can include any number of virtual machines 110, with the virtual machines 110 being instantiated and configured as needed to perform processing jobs. These processing jobs may be performed using the same applications or frameworks executing within the virtual machines as would be executing natively on a physical host machine. As a result, the host system 100 can be flexibly employed to perform processing jobs on demand, without the need for expensive, time-consuming, and knowledge-intensive set-up operations by highly skilled technicians.

The host system 100 in some examples processes big data jobs, wherein a processing job comprises gigabytes (GBs) or terabytes (TBs) of data. Performing a big data processing job can require significant processing resources and significant processing time. Further, the job data can be so large that it requires storage across multiple data storage systems 150. Moreover, where the host system 100 comprises a virtual data processing system or comprises a component of a virtual data processing cluster (see FIG. 4), the host system 100 may be processing more than one processing job.

In the example of FIG. 1, the host system 100 includes five instantiated virtual machines 110A-110E. Each instantiated virtual machine in virtual machines 110 includes a guest application 113A or 113B (hereinafter referred to together as guest applications 113) that performs a data processing operation (see FIG. 2). The particular data processing operation depends on the user/sponsor of the virtual machine 110, wherein the user can provide the guest application 113A or 113B. The first and second virtual machines 110A-110B in the example are instantiated to perform a first processing job (job 1) and the third, fourth, and fifth virtual machines 110C-110E are instantiated to perform a second processing job (job 2). In this situation, it is difficult to determine the data consumption rate, as both the first processing job and the second processing job are consuming data. The host system 100 cannot merely use the rate of incoming job data flowing into the host system 100 to determine a data consumption rate for each of these two processing jobs 1 and 2.

The cache node 120 is coupled to the plurality of virtual machines 110 and participates in the data access operations of the plurality of virtual machines 110 through the host system 100. The cache node 120 facilitates data transfers between the one or more data storage systems 150 and the plurality of virtual machines 110. In some examples, the cache node 120 tracks all read completions of data access operations (i.e. completions of read requests to read data from data storage 150 into memory for each of the virtual machines). Since cache node 120 knows from which virtual machine a read request comes, cache node 120 can track the read completions on a per-virtual machine basis. In addition, the cache node 120 is configured to allocate read completions to individual processing jobs of the one or more processing jobs being executed or performed by the host system 100.

The cache node 120 receives read requests comprising requests of job data to be transferred to a requesting virtual machine or machines 110, wherein the requesting virtual machine or machines 110 process the requested job data. The read operation information can include a read request time, i.e., a timestamp or other time information regarding when the read request was issued by the requesting virtual machine 110. The timestamp in some examples is used to compute a latency value for read completions.

In some examples, a host system 100 configured for managing data consumption rate in a virtual data processing environment comprises a communication interface 125 configured to access job data, a plurality of virtual machines 110 instantiated in the host system 100 and configured to process the job data according to one or more processing jobs being performed by the plurality of virtual machines 110. The cache node 120 is configured to track read completions for the plurality of virtual machines 110, allocate read completions to individual processing jobs of the one or more processing jobs, and accumulate read completions on a per-job basis, with the cache node 120 determining a data consumption rate for each processing job of the one or more processing jobs.

The cache node 120 therefore determines data consumption rates for individual virtual machines and for individual processing jobs. The data consumption rates comprise instantaneous data consumption rates in some examples. Alternatively, or in addition, the data consumption rates comprise average or otherwise representative data consumption rates.

The data consumption rates can be tabulated for individual virtual machines in virtual machines 110. The data consumption rates can be tabulated for individual processing jobs (i.e., a sum of data consumption rates for all virtual machines 110 that are processing the processing job). Where the host system 100 is solely executing a processing job and no other systems are participating in the processing job, the cache node 120 determines a total data consumption rate for the processing job.

In some examples, the cache node 120 determines a processing job completion time of a particular virtual machine or machines 110 using the determined data consumption rate or rates. In some examples, the cache node 120 determines a processing job completion time of a particular processing job where the particular processing job is being processed by multiple virtual machines in virtual machines 110. The cache node 120 determines a processing job completion time of a particular processing job using determined data consumption rates of all virtual machines 110 processing the particular processing job.

In some examples, the host system 100 allocates or de-allocates host system resources based on at least the data consumption rate. In some examples, the host system 100 allocates or de-allocates host system resources to a particular processing job based on at least a corresponding data consumption rate. In some examples, the cache node 120 facilitates resource allocation on a per-virtual-machine basis.

Figure 2:
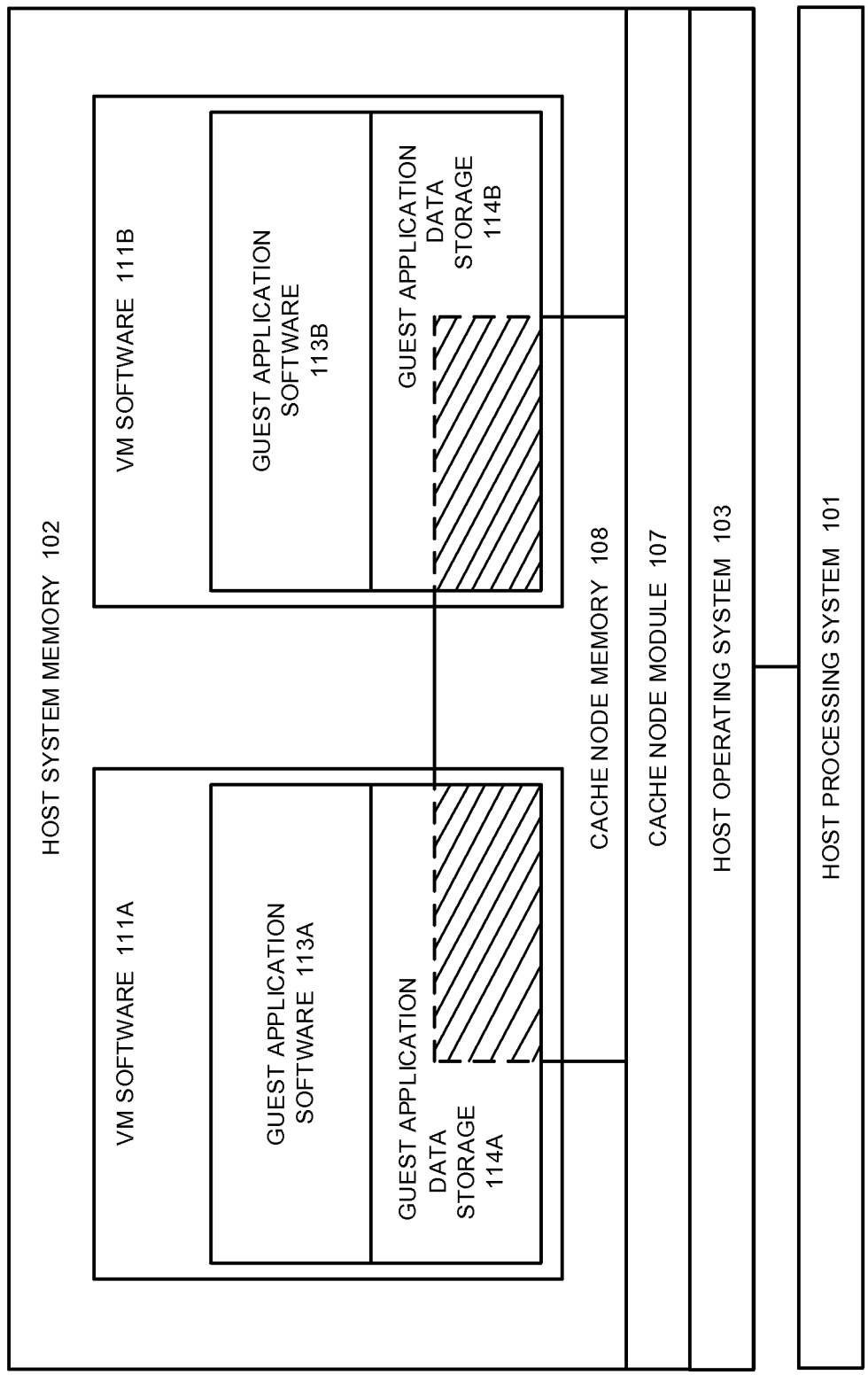
FIG. 2 shows a host system memory of the host system.

FIG. 2 shows a host system memory 102 of the host system 100. The host system memory 102 stores software that is executed by the host processing system 101 under control of the host operating system 103. The host system memory 102 further stores data, including data used in executing the software or that is produced or modified by execution of the software.

In the example, the host system memory 102 is divided up into a host operating system 103, a cache node module 107, and a cache node memory 108. The host system memory 102 further comprises a plurality of virtual machine (VM) software instances 111A-111B (hereinafter referred to together as VM software 111), which are executing on host processing system 101. The cache node module 107 comprises software executing to perform the cache node 120 and comprises cache node memory 108 for storing data being transferred to or from the plurality of virtual machines 110. Each VM software of VM software 111 is further subdivided into guest application software 113A or 113B (hereinafter referred to together as application data storage 113) and guest application data storage 114A or B (hereinafter referred to together as application data storage 114). The guest application data storage 114A and 114B is used by the guest application software 113A and 113B when the VM software 111A and 111B is executed by the host system 100.

The VM software 111 is instantiated on the host system 100 for a particular user and for a particular processing job. The VM software 111 in some examples comprises commonly-used software portions and further includes software portions that are specific to job, including factors such as the type and contents of the data itself, the location of the job data, the size of the job data, and the processing to be performed on the job data.

When in use, the host operating system uses read requests to fetch job data. The read request is a request made by a guest application. The host operating system 103 transfers the job data to the cache node 120 to be transferred to the appropriate virtual machine of virtual machines 110 and corresponding guest application data storage of guest application data storage 114. The job data is received in the cache node memory 108, to be transferred to the appropriate guest application data storage of guest application data storage 114.

It can be seen in FIG. 2 that a portion of the guest application data storage 114 is mapped to a portion of the cache node memory 108 (see hatched lines). As a result, job data provided to the cache node memory 108 is simultaneously provided to the guest application data storage 114. As a result, the job data is provided to the guest application software 113 earlier and faster than if the job data had to be written to the cache node memory 108, then followed by the job data being written from the cache node memory 108 to the guest application data storage 114. The memory mapping therefore increases data throughput and consequently speeds up data processing operations of the virtual machines 110A and 110B. In addition, this enables the cache node module 107 to monitor and record read completions on a per-job basis. The cache node module 107 records and accumulates read completions for the VM software 111A and for the VM software 111B in the example.

The cache node 120 is therefore able to allocate received read completions to either the VM software 111A (and the virtual machine 110A) or to the VM software 111B (and the virtual machine 110B), and can allocate the received job data on a per-job basis. The cache node 120 in the example generates information regarding a data consumption rate for each processing job being executed by the host system 100.

The cache node 120 in some examples monitors a request queue of the host system 100 and handles read requests as they occur. Other mechanisms are possible, such as direct calls between a data interface of the host system 100 and the cache node 120. In some implementations, a completion queue is maintained, wherein the cache node 120 records the completed read requests in the completion queue.

Figure 3:
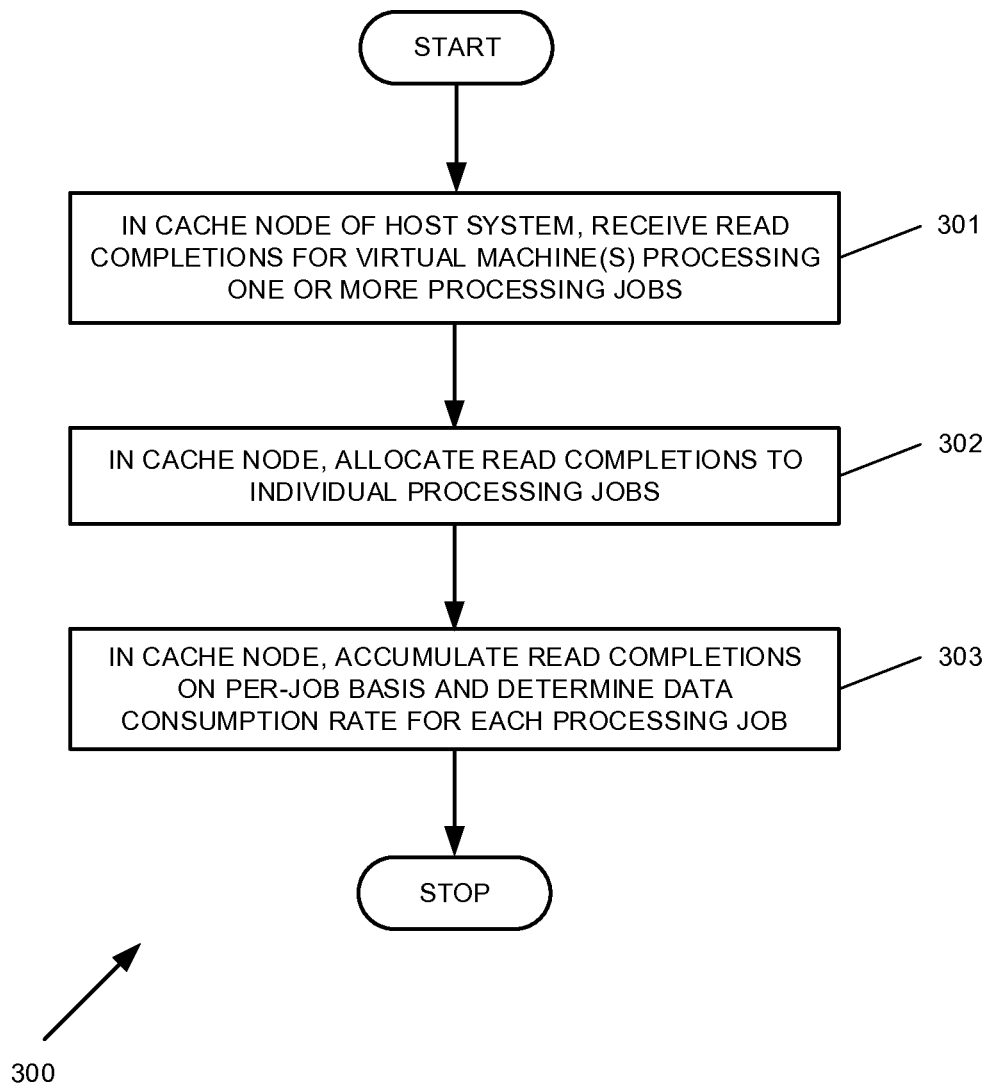
FIG. 3 is a flowchart of a method for managing data consumption rate in a virtual data processing environment.

FIG. 3 is a flowchart 300 of a method for managing data consumption rate in a virtual data processing environment. In step 301, a cache node of a host system tracks read completions for one or more virtual machines instantiated in the host system. The one or more virtual machines are processing one or more processing jobs. Read completions are generated when requested job data is received by the host system for use by the one or more virtual machines in processing the one or more processing jobs.

In step 302, the cache node allocates read completions to individual processing jobs of the one or more processing jobs. The cache node communicates with all virtual machines instantiated in the host machine and determines a destination virtual machine corresponding to each job data read completion.

In step 303, the cache node accumulates read completions on a per-job basis, i.e., the cache node tabulates the read completions for each processing job. The cache node tabulates the read completions as the read completions occur. Consequently, the cache node generates a data consumption rate for each processing job of the one or more processing jobs.

Figure 4:
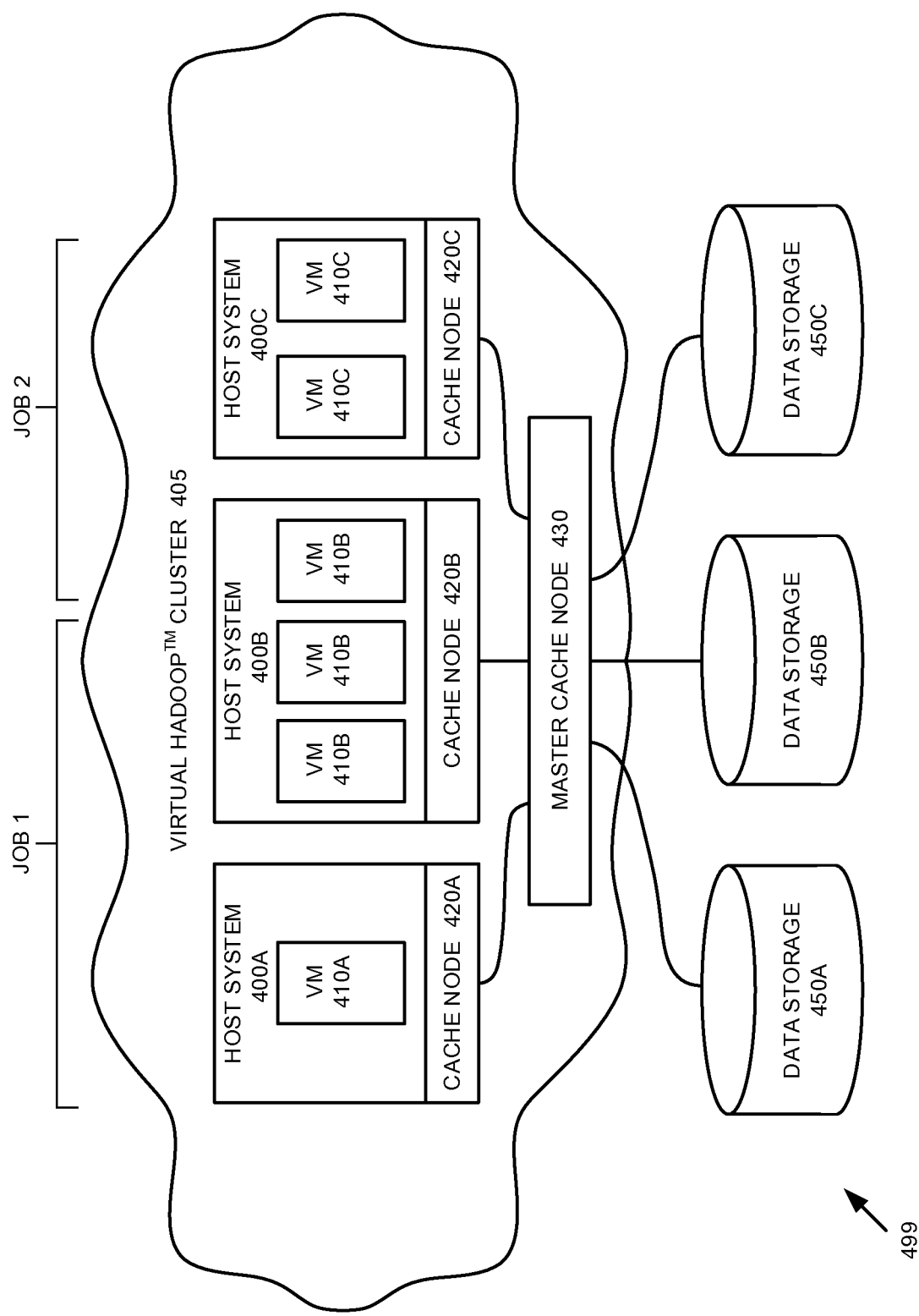
FIG. 4 shows an exemplary processing environment comprising a virtual processing cluster in communication with a plurality of data storage systems.

FIG. 4 shows an exemplary virtual data processing environment 499 comprising a virtual processing cluster 405 in communication with a plurality of data storage systems 450. The virtual processing cluster 405 accesses job data from the plurality of data storage systems 450A-450C (hereinafter referred to together as data storage systems 450). The virtual processing cluster 405 in one example comprises a Hadoop™ processing cluster 405 employing Hadoop™ and "map reduce" virtualization software and processes, but it should be understood that other software can be employed in the virtual processing cluster 405.

The virtual processing cluster 405 in this example comprises a plurality of host systems 400A-400C (hereinafter referred to together as host systems 400). The plurality of host systems 400 can be the same or different from the host system 100 of FIG. 1. Each host system in host systems 400 can host a plurality of instantiated virtual machines. Each host system 400 can process one or more processing jobs. Each host system in host systems 400 can allocate instantiated virtual machines 410A-410C (hereinafter referred to together as virtual machines 410) to the one or more processing jobs. The virtual processing cluster 405 further comprises a master cache node 430. The master cache node 430 is in communication with the plurality of host systems 400. In some examples, the master cache node 430 is in communication with a plurality of cache nodes 420A-420C (hereinafter referred to together as cache nodes 420) of the plurality of host systems 400.

Data processing jobs being processed in the processing environment 499 can be distributed across multiple host systems 400, wherein the processing rate of a data processing job is accelerated by multiple host systems 400 working in parallel. In addition, each host system 400 can host multiple virtual machines 410, wherein a portion of a data processing job given to a particular host system 400 can be distributed across multiple instantiated virtual machines 410.

Job monitoring is difficult in such a distributed processing environment 499. Where a processing job is distributed across multiple host machines 400, and further distributed across multiple virtual machines 410 within each host machine 400, it may be difficult to determine the progress of each processing job and whether a processing job will be completed within an expected or needed time period.

The master cache node 430 comprises a system or component of the virtual processing cluster 405. The master cache node 430 in some examples is an independent element of the virtual processing cluster 405, although the master cache node 430 can alternatively comprise a portion or component of one host system in host systems 400 of the virtual processing cluster 405. In some examples, a cache node of cache nodes 420 of a particular host system in host systems 400 can further comprise a master cache node that performs the functionality of the master cache node 430. However, for simplicity, the discussion herein will comprise a discussion of an independent master cache node 430.

In some examples, each cache node of cache nodes 420 of each host system of host systems 400 in the virtual processing cluster 405 receives read completions for one or more virtual machines 410 instantiated in the host system 400, with the one or more virtual machines 410 processing the one or more processing jobs, each cache node of cache nodes 420 of each host system of host systems 400 in the virtual processing cluster 405 allocates the read completions to individual processing jobs of the one or more processing jobs, each cache node of cache nodes 420 of each host system of host systems 400 in the virtual processing cluster 405 accumulates the read completions on a per-job basis, and a master cache node 430 receives and accumulates the read completions for all host systems 400 and for all processing jobs of the one or more processing jobs, with the master cache node 430 determining a data consumption rate for each processing job of the one or more processing jobs. While the master cache node 430 is shown separately from cache nodes 420, one of cache nodes 420 may include functionality of the master cache node or the master cache node functionality may otherwise be performed on one of host systems 400.

Figure 5:
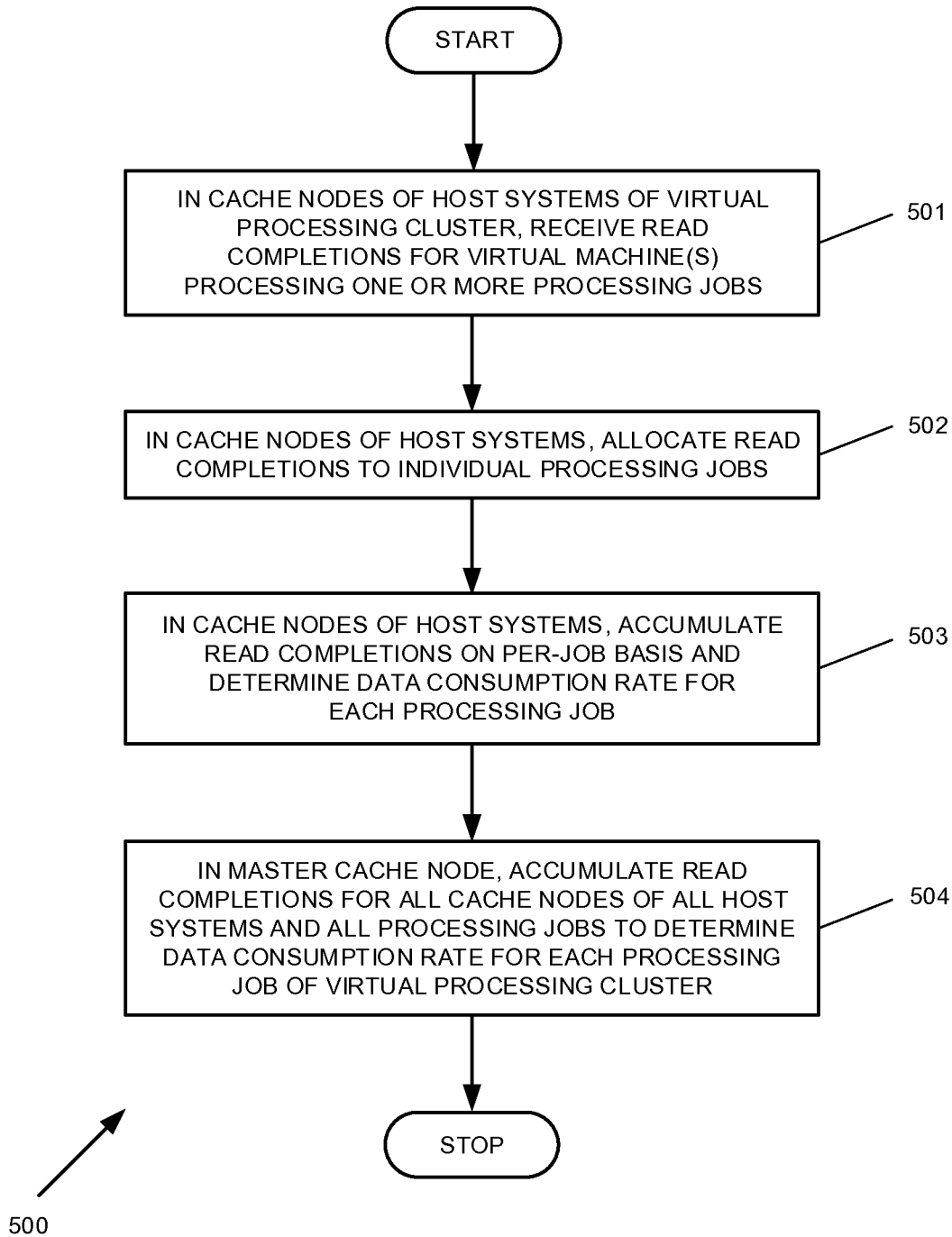
FIG. 5 is a flowchart of a method for managing data consumption rate in a virtual processing cluster of a virtual data processing environment.

FIG. 5 is a flowchart 500 of a method for managing data consumption rate in a virtual processing cluster of a virtual data processing environment. In step 501, each cache node of each host system of a virtual processing cluster tracks read completions for one or more virtual machines instantiated in the host system. The one or more virtual machines are processing one or more processing jobs. Read completions are generated when requested job data is received by the host system for use by the one or more virtual machines in processing the one or more processing jobs.

In step 502, each cache node of each host system allocates read completions to individual processing jobs of the one or more processing jobs of the virtual processing cluster. The cache node communicates with the virtual machines instantiated in each host system and determines a destination virtual machine corresponding to each job data read completion.

In step 503, each cache node of each host system accumulates read completions on a per-job basis. Consequently, each cache node of each host system generates a data consumption rate for each processing job of the one or more processing jobs.

In step 504, a master cache node accumulates read completions for all cache nodes of all host systems and for all processing jobs of the virtual processing cluster. The master cache node determines data consumption rates for each processing job of the virtual processing cluster. The master cache node determines overall consumption rates for the virtual processing cluster. The master cache node determines overall data consumption rates for each processing job being processed in the virtual processing cluster.

Figure 6:
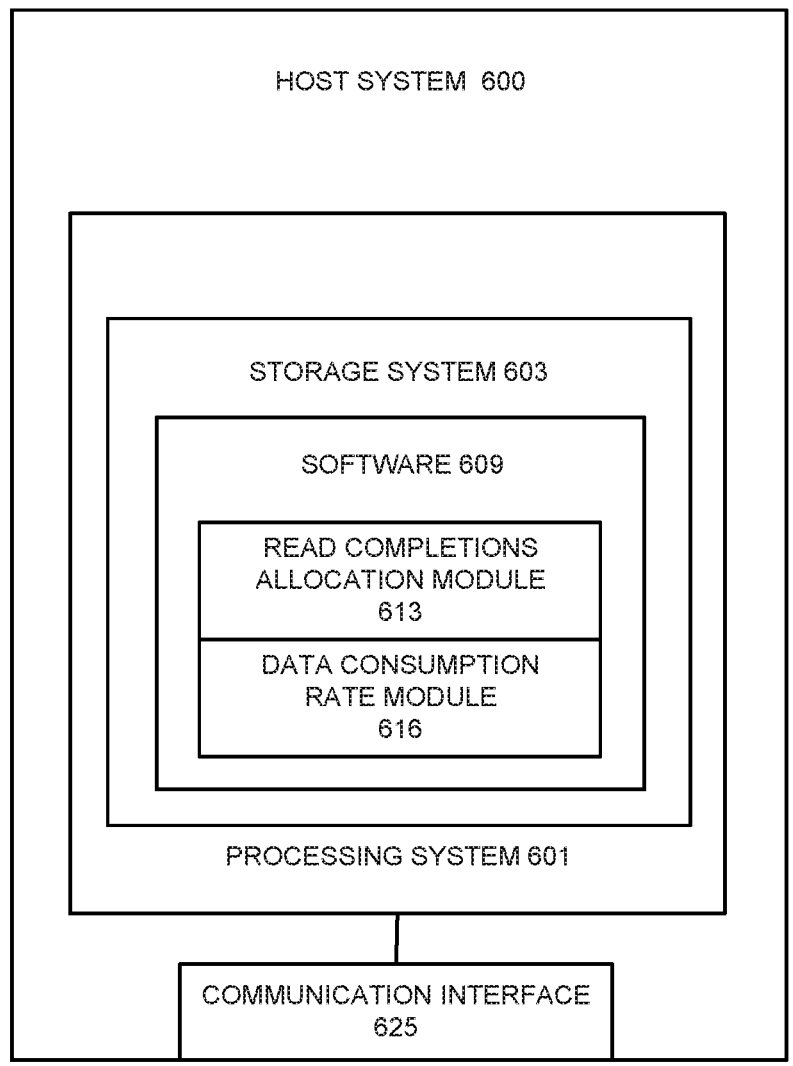
FIG. 6 shows detail of an exemplary host system configured for managing data consumption rate in a virtual data processing environment.

FIG. 6 shows detail of an exemplary host system 600 for managing data consumption rate in a virtual data processing environment. The host system 600 includes a communication interface 625, a processing system 601 coupled to the communication interface 625, and a storage system 603 coupled to the processing system 601. The storage system 603 can be separate from or included in the processing system 601.

The storage system 603 in the example shown includes software 609. In some examples, the software 609 comprises operating instructions that configure the processing system 601, when executed by the host system 600 in general or the processing system 601 in particular, to direct the processing system 601 to perform cache node or master cache node operations. Other data, such as operational data, may also be stored in the storage system 603. The software 609 in one example comprises at least a read completions allocation module 613 and a data consumption rate module 616. The read completions allocation module 613 receives read completions and allocates read completions to virtual machines and to appropriate processing jobs, as previously discussed, wherein read completions are accumulated on a per-job basis. The data consumption rate module 616 generates data consumption rates from the allocated and accumulated read completions, as previously discussed.

The processing system 601 may comprise a microprocessor and other circuitry that retrieves and executes the software 609 from the storage system 603. The processing system 601 may be implemented within a single processing device, but may also be distributed across multiple processing devices or sub-systems that cooperate in executing program instructions. Examples of the processing system 601 include general purpose central processing units, application specific processors, and logic devices, as well as any other type of processing device, combinations, or variations.

The storage system 603 may comprise any computer readable storage media readable by the processing system 601 and capable of storing the software 609. The storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations the storage system 603 may also include communication media over which the software 609 may be communicated internally or externally. The storage system 603 may be implemented as a single storage device but may also be implemented across multiple storage devices or sub-systems co-located or distributed relative to each other. The storage system 603 may comprise additional elements, such as a controller, capable of communicating with the processing system 601 or possibly other systems.

The software 609 may be implemented in program instructions and among other functions and may, when executed by the processing system 601, direct the processing system 601 to operate as described herein. In particular, the program instructions may include various components or modules that cooperate or otherwise interact to implement at least a portion of a host system. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. The software 609 may include additional processes, programs, or components, such as operating system software, hypervisor software, or other application software. The software 609 may also comprise firmware or some other form of machine-readable processing instructions executable by the processing system 601.

In general, the software 609, when loaded into the processing system 601 and executed, may transform a suitable apparatus, system, or device from a general-purpose computing system into a special-purpose computing system customized to manage processing jobs in a virtual data processing environment. Indeed, encoding the software 609 on the storage system 603 may transform the physical structure of the storage system 603. The specific transformation of the physical structure may depend on various factors in different implementations of this description. Examples of such factors may include, but are not limited to the technology used to implement the storage media of the storage system 603 and whether the computer-storage media are characterized as primary or secondary storage, as well as other factors.

The communication interface 625 may include communication connections and devices that allow for communication with other computing systems (not shown) over a communication network or collection of networks (not shown). The communication interface 625 may include user input and output devices for being controlled by a user. The communication interface 625 may include associated user interface software executable by the processing system 601 in support of various user input and output devices.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing data consumption rate in a virtual data processing environment, the virtual data processing environment comprising a plurality of processing jobs executing on a plurality of virtual machines, wherein each processing job in the plurality of processing jobs is allocated two or more virtual machines in the plurality of virtual machines, and wherein each processing job in the plurality of processing jobs executes on virtual machines separate from the other processing jobs in the plurality of processing jobs, the method comprising:
    in a cache node, identifying read completion data for each virtual machine in the plurality of virtual machines, wherein the read completion data for each virtual machine tracks read completions from one or more data storage systems by the processing job allocated to the virtual machine, and wherein the plurality of processing jobs each comprise a big data processing job, wherein the cache node facilitates data transfers of job data to be processed by the plurality of processing jobs between the one or more data storage systems and the plurality of virtual machines via a cache memory of the cache node by receiving the job data requested by the plurality of processing jobs from the one or more data storage systems and providing the job data to the plurality of processing jobs by writing the job data to the cache memory;
    in the cache node, tracking job read completions for each processing job in the plurality of processing jobs based on the read completion data identified from the plurality virtual machines;
    in the cache node, determining a data consumption rate for each processing job of the plurality of processing jobs based on the job read completions associated with each processing job in the plurality of processing jobs; and
    allocating or de-allocating host system resources to at least one of the plurality of processing jobs based on at least a corresponding data consumption rate.

2. The method of claim 1, wherein allocating or de-allocating host system resources to the at least one of the plurality of processing jobs based on at least a corresponding data consumption rate comprises allocating or de-allocating host system resources to the at least one of the plurality of processing jobs based on at least the data consumption rate for each processing job in the plurality of processing jobs.

3. The method of claim 1, further comprising predicting one or more job completion times of the plurality of processing jobs, with the one or more job completion times based on one or more corresponding data consumption rates.

4. The method of claim 1, further comprising:
    predicting a job completion time of a particular processing job based on at least the corresponding data consumption rate; and
    allocating or de-allocating host system resources to the particular processing job based on the predicted job completion time.

5. The method of claim 1, wherein the plurality of processing jobs comprise Hadoop processing jobs.

6. The method of claim 1, wherein the plurality of virtual machines execute on a first host system with the cache node, wherein the virtual data processing environment comprises a second plurality of virtual machines executing on a second host system capable of executing the plurality of processing jobs, and wherein the method further comprises:
    in the cache node, transferring the job read completions for each processing job in the plurality of processing jobs to a master cache node; and
    in the master cache node, receiving, from the cache node and a second cache node associated with the second plurality of virtual machines on the second host system, the job read completions and additional job read completions, and determining an overall data consumption rate for the plurality of processing jobs based on the job read completions and the additional job read completions.

7. The method of claim 1, wherein increased data throughput of the job data is achieved by mapping a portion of memory of each of the plurality of virtual machines to a corresponding portion of the cache memory of the cache node.

8. An apparatus comprising:
    one or more non-transitory computer readable storage media;
    program instructions stored on the one or more non-transitory computer readable media that, when executed by a processing system of a host system, direct the processing system to perform a method of managing data consumption rate in a virtual data processing environment, the virtual data processing environment comprising a plurality of processing jobs executing on a plurality of virtual machines, wherein each processing job in the plurality of processing jobs is allocated two or more virtual machines in the plurality of virtual machines, and wherein each processing job in the plurality of processing jobs executes on virtual machines separate from the other processing jobs in the plurality of processing jobs, the method comprising:

facilitating, by a cache node interposed between one or more data storage systems and the plurality of virtual machines, data transfers of job data to be processed by the plurality of processing jobs between the one or more data storage systems and the plurality of virtual machines, including identifying read completion data for each virtual machine in the plurality of virtual machines via a cache memory of the cache node by receiving the job data requested by the plurality of processing jobs from the one or more data storage systems and providing the job data to the plurality of processing jobs by writing the job data to the cache memory, wherein the read completion data for each virtual machine tracks read completions from the one or more data storage systems by the processing job allocated to the virtual machine;

tracking, by the cache node, job read completions for each processing job in the plurality of processing jobs based on the read completion data identified from the plurality of virtual machines; and determining, by the cache node, a data consumption rate for each processing job of the plurality of processing jobs based on the job read completions associated with each processing job in the plurality of processing jobs; and allocating or de-allocating host system resources to at least one of the plurality of processing jobs based on at least a corresponding data consumption rate.

9. The apparatus of claim 8, wherein allocating or de-allocating host system resources to the at least one of the plurality of processing jobs based on at least a corresponding data consumption rate comprises allocating or de-allocating host system resources to the at least one of the plurality of processing jobs based on at least the data consumption rate for each processing job in the plurality of processing jobs.

10. The apparatus of claim 8, wherein the method further comprises predicting one or more job completion times of the plurality of processing jobs being processed by the host system, with the one or more job completion times based on one or more corresponding data consumption rates.

11. The apparatus of claim 8, wherein the method further comprises:
predicting a job completion time of a particular processing job based on at least the corresponding data consumption rate; and
allocating or de-allocating host system resources to the particular processing job based on the predicted job completion time.

12. The apparatus of claim 8, wherein the virtual machines comprise a Hadoop virtual processing cluster, and wherein the plurality of processing jobs comprise Hadoop processing jobs.

13. The apparatus of claim 8, wherein the method further comprises:
transferring the job read completions for each processing job in the plurality of processing jobs to a master cache node, wherein the master cache node determines an overall data consumption rate based on the job read completions and additional job read completions received from one or more host systems.

14. The apparatus of claim 8, wherein increased data throughput of the job data is achieved by mapping a portion of memory of each of the plurality of virtual machines to a corresponding portion of the cache memory of the cache node.

15. A method for managing data consumption rate in a virtual data processing environment, the virtual data processing environment comprising a plurality of processing jobs executing on a plurality of virtual machines, wherein each processing job in the plurality of processing jobs is allocated two or more virtual machines in the plurality of virtual machines, and wherein each processing job in the plurality of processing jobs executes on virtual machines separate from the other processing jobs in the plurality of processing jobs, the method comprising:
in cache nodes on host systems of a virtual data processing environment, tracking job read completions for each processing job in the plurality of processing jobs based on read completion data identified for each virtual machine in the plurality of virtual machines, wherein the read completion data for each virtual machine tracks read completions from one or more storage systems by the processing job allocated to the virtual machine, wherein the cache nodes facilitate data transfers of data to be processed by the plurality of processing jobs between the one or more storage systems and the plurality of virtual machines via cache memories of the cache nodes by receiving the job data requested by the plurality of processing jobs from the one or more data storage systems and providing the job data to the plurality of processing jobs by writing the job data to the cache memories and wherein the plurality of processing jobs each comprise a big data processing job;
in the cache nodes, transferring the job read completions for each processing job in the plurality of jobs to a master cache node; and
in the master cache node, receiving the job read completions for the plurality of processing jobs, and determining a data consumption rate for each processing job of the plurality of processing jobs based on the job read completions; and
allocating or de-allocating host system resources to at least one of the plurality of processing jobs based on at least a corresponding data consumption rate.

16. The method of claim 15, wherein allocating or de-allocating host system resources to the at least one of the plurality of processing jobs based on at least a corresponding data consumption rate comprises allocating or de-allocating host system resources to the at least one of the plurality of processing jobs based on at least the data consumption rate for each processing job in the plurality of processing jobs.

17. The method of claim 15, further comprising predicting one or more job completion times of the plurality of processing jobs being processed by the host systems, with the one or more job completion times based on one or more corresponding data consumption rates.

18. The method of claim 15, further comprising:
predicting a job completion time of a particular processing job based on at least the corresponding data consumption rate; and
allocating or de-allocating host system resources to the particular processing job based on the predicted job completion time.

19. The method of claim 15, wherein the plurality of processing jobs comprise Hadoop processing jobs.

20. The method of claim 15, wherein increased data throughput of the job data is achieved by mapping a portion of memory of each of the plurality of virtual machines to a corresponding portion of a cache memory of the cache memories of the cache nodes.

* * * * *